Patented July 20, 1937

2,087,395

UNITED STATES PATENT OFFICE 2,087,395

LIQUID COATING COMPOSITION

Augustus H. Batchelder, Berkeley, Calif., assignor to Standard Oil Company of California, San Francisco, Calif., a corporation of Delaware No Drawing. Application May 16, 1933,
Serial No. 671,366

5 Claims. (Cl. 134—1)

This invention relates to improvements in liquid coating compositions and refers more particularly to improvements in vehicles for such compositions obtainable through incorporation therein of certain materials segregated from natural petroleum, its fractions or its derivatives as hereinafter described.

While the field of liquid coating compositions is extremely broad and the compositions themselves often appear entirely dissimilar and unrelated, as for instance printer's ink and spar varnish, certain basic characteristics are present in all. They all must contain a vehicle and a film forming material while many contain in addition a pigment, a dye, a varnish material, a drier, or a plasticizer and some contain several or all of these. Likewise, all must possess a drying action whether it be due to evaporation of the vehicle, to absorption of atmospheric oxygen, to having the vehicle absorbed by the surface coated or to a combination of these functions. Also, all must possess a certain degree of flow in order to spread and cover when applied and a certain degree of penetration in order to adhere when dried.

These characteristics of a coating composition are in reality characteristics of the vehicle employed in its preparation. In order to accommodate such a large number of independent variables the vehicle for any but the simplest of coating compositions can seldom be a single substance. Drying oils such as Chinawood and linseed, vegetable oils such as castor and olive, solvent oils such as rosin oil and coal tar distillates, varnish solvents, cutters and thinners are used in all manner of combinations and in widely varying proportions.

In spite of the seemingly wide range of materials available from which vehicles may be compounded, it is still very often difficult to secure the requisite combination of characteristics for a given specific use. Sufficiently rapid drying may be difficult to obtain without sacrifice in solvent power, high solvent power may require unduly increased volatility, low volatility may require a sacrifice in penetration, high penetration may reduce the body of the product, and so on, each dilemma requiring a compromise.

It has been discovered that certain materials or groups of materials of petroleum origin, now available as byproducts of the more modern processes of refining petroleum by solvent extraction, are possessed of a useful and unexpected combination of properties. It is my discovery that the functions of such materials when used in preparing vehicles for liquid coating compositions permit the number of such undesirable compromises to be materially reduced and the drying, flowing, penetrating and covering qualities of such compositions to be more easily predetermined and controlled.

These materials which are broadly the more polar constituents of natural petroleum fractions as hereinafter defined, are removed or extracted therefrom by well known methods hereinafter enumerated and may be utilized in liquid coating compositions as hereinafter described and claimed.

During the past decade chemists generally have come to recognize the concept of "polarity" as fundamental to an understanding of the broad differences which exist between different chemical classes or families. The terms, "polar" and "non-polar", "more polar" and "less polar" have thus become definitely established in the chemical literature. In the broadest sense, these terms are interchangeable with reactive and unreactive, more reactive and less reactive. They are obviously entirely relative.

It is well known that most natural petroleums are made up of compounds belonging to many different classes and subclasses. These groups vary in reactivity from the completely non-polar paraffins on the one hand to the very polar and hence very reactive styrols, diolefins, carboxylic acids and nitrogen and sulfur containing compounds on the other.

It is also well known that the art of petroleum refining has since the beginning been concerned with the removal of the more polar, more reactive constituents from natural petroleum or its fractions in order that the refined products should be less subject to chemical change during use. Petroleum refining is, therefore, broadly a separation of the natural material into more polar and less polar groups.

Until quite recently this separation has usually been effected by reacting the more polar components with a powerful chemical reagent, sulfuric acid. The more polar bodies thus reacted upon were so violently attacked that they could seldom be reclaimed in anything like their original form and were generally considered simply as an unescapable nuisance to be disposed of in the simplest possible manner.

It is now generally realized, due to a better understanding of the simple fundamental laws of solubility, that such drastic treatment is largely unnecessary. There are a number of solvents of limited miscibility with petroleum and its fractions which, when applied as liquid washes or extractants, will dissolve the more polar components of the petroleum without chemical change and leave the bulk of less polar material.

One such solvent extraction or solvent refining process which has been developed to full commercial scale and has been adopted in a large way, employs liquid sulfur dioxide or a mixture of liquid sulfur dioxide and benzene as the extractant. Other extractants which are the equivalent of liquid sulfur dioxide in that they will extract in general the same bodies from a given petroleum and differ only in the completeness of extraction or the economics or convenience in handling, include aniline, acetone, nitrobenzene, phenol, dichloroethyl ether, furfural, pyridine and various combinations of these and other liquids.

Usually the solvent or extractant used will boil at a temperature somewhat below the lowest boiling constituent in the material being treated in order that the solvent may be readily eliminated from the refined product and reclaimed for reuse. The extractant is thus likewise easily removable from the extracted, more polar, material which thus remains chemically unchanged and available for any desired use.

Refinement by solvent extraction was at first applied only to low boiling lamp oils but more recently has been extended to include the higher boiling lamp oils, lubricating oils, medicinal and cosmetic oils and in some cases even the heavy cylinder stocks.

This development has made available in the modern petroleum refinery a very considerable volume of these more polar constituents of crude oil covering a range of molecular weights roughly from 150 to 500 or above.

The chemist was not slow to recognize that herein exists a new raw material of new and undetermined properties and hence new and unexploited possibilities. He forthwith set about to determine its properties and to develop its applications. Utilization of the lower boiling fractions, of average molecular weight from 150 to about 200, as low cost substitutes for the light, aromatic rich, coal tar and oil gas tar distillates in volatile vehicles for paints and lacquers, as a solvent for rubber in a wide variety of applications, as denaturants in special alcohol formulae and in many other somewhat similar ways is already general practice. Uses for the extracts of molecular weight greater than 200 were, however, not so easily apparent and to my knowledge no practical application for them in more than insignificant quantities has yet been disclosed.

An object of this invention is to provide a vehicle for liquid coating compositions which shall have functions variable through a wider range than has been possible in vehicles hitherto available.

Another object of the invention is to provide a vehicle for liquid coating compositions derived wholly or in part from natural petroleum.

Still another object is to develop a vehicle for such compositions which shall combine within a single raw material many of the desirable functions of the hitherto known vehicles and shall be commercially available in large quantity.

A further object of the invention is to provide a vehicle of desirable functions for use in liquid coating compositions which is at the same time economically desirable.

Another object is to develop an economic use for a hitherto discarded by-product of the petroleum refining industry.

Still other objects will be apparent from the following description and examples of compositions involving the invention.

Liquid sulfur dioxide or sulfur dioxide-benzol extracts, sometimes referred to as Edeleanu extracts but more commonly as "$SO_2$" extracts, are immediately available in commercial quantity. I have, therefore, chosen them for study, experimentation and discussion with the full realization that there are several, now well known, extractants the use of which in the refinement of a given petroleum fraction will produce a polar extract similar in all essential respects to an $SO_2$ extract from the same fraction.

It will readily be understood, therefore, that nothing that is said herein is to be construed as limiting my invention to the polar extract separated by any specific extractant from any particular petroleum or its fractions.

The polar extracts separable by liquid sulfur dioxide from an asphaltic base California oil will contain many chemical types and classes of compounds; aromatic hydrocarbons, substituted aromatics, partially hydrogenated aromatics, condensed ring structures containing either five or six membered rings, nitrogen, sulfur and oxygen bodies with such atoms either in or attached to the rings, styrols, phenols, carboxylic acids, nitrogen bases and many others may be found in varying proportions.

Such extracts are extremely complex from a chemical point of view and will obviously possess, as a group, properties which are a composite of the properties of all the different chemical types and individuals. In the lower boiling ranges where the molecular weight somewhat limits the number of possible types and the complexity of compounds of a given type which may be present, the group properties were, however, at least broadly predictable and as already stated, uses for the lighter polar extracts were quickly found. With the higher boiling fractions, however, it remained for trial and experiment to disclose properties and combinations of properties that would indicate the fields of usefulness for these new and entirely unique industrial raw materials.

I have now discovered that such higher boiling "$SO_2$" extracts, of molecular weight greater than 200, are possessed of a group of properties which make them particularly suited for use in vehicles for liquid coating compositions.

Briefly, I have discovered that they possess a high degree of solvent power for dyes and resins, that they have high carrying power for dispersed and suspended pigments, that in the presence of metallic driers they possess drying properties approaching if not entirely equal to the natural drying oils and that they combine excellent penetration with low volatility. Altogether, a group of properties hitherto unknown in any single raw material of commerce and attainable only by careful selection and blending of several raw materials each considerably more expensive than these by-product extracts of the petroleum refinery.

The following specific comparisons of certain of the functions of these more polar extracts from petroleum with those for the best materials now used in compounding vehicles for coating compositions will serve more fully to illustrate the nature and scope of my invention.

I have found that an extract having an average molecular weight of 230–270 from a mineral seal or light lubricating oil distillate from California petroleum is equal in solvent power for dyes and asphaltic pigments, such as gilsonite, to distilled natural rosin oils and is superior to synthetic rosin oils. An extract, having an average molecular weight of about 300–400 from a medium or heavy lubricating oil when used with a metallic drier is equal in drying properties, when applied in thin films, to a boiled linseed oil and when used together with a relatively small proportion of China-wood oil, may even be superior in drying power to boiled linseed oil. As a solvent for the synthetic resins such as those derived from the polymerization of coumarone and indene, from the condensation of phenol and formaldehyde, from the special processing of vegetable oils and gums and by resinification of certain derivatives of petroleum, the mineral seal oil extracts are substantially equal to the distilled rosin oils and are superior to the high flash coal tar naphthas. The penetration of such compositions as printing inks wherein rosin oils have been replaced by petroleum extracts is excellent and has been indicated by my own experiments to be at least equal to inks employing the more expensive rosin oils.

In the medium grade paints of wide industrial application, such as aluminum paint and red lead primer, these high boiling petroleum extracts with appropriate metallic driers are the equivalent of the more expensive linseed oil as drying oils and may even be superior in their ability to carry heavy loads of pigment and when so loaded to retain desirable flow and covering power.

In cheaper asphaltic paints the ability of the polar extracts to carry high pigment loads and yet retain fluidity is far superior to whole petroleum fractions of the same boiling range and molecular weight. The following measurements of penetration on different concentrations of gilsonite in several media will illustrate this point.

TABLE 1

*Penetration of gilsonite dispersions*

| Gms. gilsonite per 100 gms. solvent | Solvent | | |
| --- | --- | --- | --- |
| | Pale oil | Mineral seal oil | Extract from mineral seal oil |
| 120 | 104 | 81 | 345 |
| 100 | 134 | 120 | 410+ |
| 80 | 302 | 242 | Too soft |
| 60 | 395 | 398 | Too soft |
| 40 | Too soft | Too soft | Too soft |

It is thus readily apparent that these higher boiling extracts combine all of the major properties desired in a vehicle for a liquid coating composition and can therefore, due to their substantially lower price, be substituted for all or part of the drying oils, solvents, penetrating oils, etc., at present used in such compositions with very worthwhile economic advantage.

Broadly, they combine high solvent power, low volatility, active drying characteristics, good penetrating power and high load carrying ability to a degree not to be found in any other raw material.

The breadth of applicability of my invention and how it may be used will best be understood from the following specific formulae covering four distinct classes of coating compositions. The particular method of compounding any of these formulae is not significant and will conform substantially to the best practice prevailing in the art.

*Example I.*—As an example of a metal primer or a cheap pigment coating the following approximate formula may be used:

| | Per cent by weight |
| --- | --- |
| Red iron oxide | 30 |
| Fine powdered asbestos | 4 |
| Extract from petroleum (av. m. wt. 350–450) | 40 |
| Raw linseed oil | 18 |
| Turpentine drier | 8 |
| | 100 |

A light petroleum thinner may be used when necessary to obtain the desired brushing consistency.

*Example II.*—An entirely different class of coating compositions is illustrated by the following formulae for printing inks which I have found to be satisfactory:

(a) *Book black*

| | Per cent by weight |
| --- | --- |
| Carbon black | 17 |
| Chinese blue | 5 |
| Linseed litho varnish | 25 |
| Extract from petroleum (av. m. wt. 350–400) | 33 |
| Extract from petroleum (av. m. wt. 230–270) | 10 |
| Drier | 10 |
| | 100 |

(b) *Half tone black*

| | Per cent by weight |
| --- | --- |
| Carbon black | 24 |
| Extract from petroleum (av. m. wt. 300) | 40 |
| Boiled linseed oil | 12 |
| Gilsonite 25% in petroleum extract (av. m. wt. 250) | 12 |
| Drier | 12 |
| | 100 |

*Example III.*—As a vehicle for an aluminum paint I may use the following:

| | Per cent by weight |
| --- | --- |
| Extract from petroleum (av. m. wt. 350–400) | 55 |
| Boiled China-wood oil | 35 |
| Drier | 10 |
| | 100 |

To this should be added 2¼ pounds of aluminum bronze powder per gallon, mixing thoroughly immediately before use and thinning to brushing consistency with mineral spirits.

*Example IV.*—In a cheap varnish for general use I may use the following composition:

| | Per cent by weight |
| --- | --- |
| Rosin | 10 |
| China-wood oil | 20 |
| Extract from petroleum (av. m. wt. 350–400) | 15 |
| Liquid drier | 5 |
| Petroleum spirits | 50 |
| | 100 |

The China-wood oil and rosin should be heated at 450–500° F. with stirring until the desired body is obtained. The drier and extract should be added while still hot and after cooling the petroleum thinner may be stirred in.

The substitution of a synthetic resin, such as the familiar phenol-formaldehyde or coumarone-indene products, for the pine tar rosin gives a varnish having desirable properties for use in electrical insulating work.

While specific ingredients and proportions have been given in the foregoing examples for the purpose of illustration, it is understood that the invention is not limited thereto, but is of the scope of the claims hereinafter set forth.

It should now be clear that I have discovered in the more polar constituents extracted by liquid sulfur dioxide or an equivalent extractant from natural petroleum or its fractions boiling above ordinary lamp oils, e. g., of average molecular weight greater than 200, a new and desirable material for use in compounding vehicles for liquid coating compositions.

While for most such uses these polar extracts require no special treatment after complete removal of the extractant, it may in certain cases be desirable to modify one or more of the non-functional properties such as color, odor, etc., by subsequent treatment. Such incidental treatment would be obvious to one skilled in the art and is entirely comprehended by this invention.

The expression "a vehicle" as used in the appended claims is not intended to exclude the presence in the liquid coating composition of other supplemental vehicles or ingredients to be used concurrently with the claimed vehicle.

Having now fully disclosed my invention and taught how it may be used with new and valuable results, I claim:

1. In a liquid coating composition, a vehicle consisting essentially of a natural petroleum extract having an average molecular weight above approximately two hundred and comprised largely of unsaturated cyclic, aromatic, naphthenic, polycyclic, and heterocyclic compounds, said extract being characterized in that it is obtainable by selective solvent extraction of these compounds from natural asphaltic and mixed base petroleums and their distillates, distillable without substantial decomposition and being further characterized by possessing the several properties of solvent power, load carrying power, fluidity when loaded, penetrating power, and drying power.

2. In a liquid coating composition, a vehicle consisting essentially of a natural petroleum extract having an average molecular weight above approximately two hundred and comprised largely of unsaturated cyclic, aromatic, naphthenic, polycyclic, and heterocyclic compounds, said extract being substantially free from diolefins and characterized in that it is obtainable by selective solvent extraction of these compounds from natural asphaltic and mixed base petroleums and their distillates, distillable without substantial decomposition, and being further characterized by possessing the several properties of solvent power, load carrying power, fluidity when loaded, penetrating power, and drying power.

3. A liquid coating composition containing a pigment, a metallic drier, and a substantial proportion of an extract obtainable by selective solvent extraction from natural asphaltic and mixed base petroleums and their distillates, said extract having an average molecular weight above approximately two hundred, consisting largely of unsaturated cyclic, aromatic, naphthenic, polycyclic, and heterocyclic compounds which are distillable without substantial decomposition, and being further characterized by possessing the several properties of solvent power, load carrying power, fluidity when loaded, penetrating power, and drying power.

4. A liquid coating composition containing a vegetable drying oil, a varnish resin, a metallic drier, and a substantial proposition of an extract obtainable by selective solvent extraction from natural asphaltic and mixed base petroleums and their distillates, said extract having an average molecular weight above approximately two hundred, consisting largely of unsaturated cyclic, aromatic, naphthenic, polycyclic, and heterocyclic compounds which are distillable without substantial decomposition, and being further characterized by possessing the several properties of solvent power, load carrying power, fluidity when loaded, penetrating power, and drying power.

5. A liquid coating composition containing a vegetable drying oil, carbon black, a metallic drier and a substantial proportion of an extract obtainable by selective solvent extraction from natural asphaltic and mixed base petroleums and their distillates, said extract having an average molecular weight above approximately two hundred, consisting largely of unsaturated cyclic, aromatic, naphthenic, polycyclic, and heterocyclic compounds which are distillable without substantial decomposition, and being further characterized by possessing the several properties of solvent power, load carrying power, fluidity when loaded, penetrating power, and drying power.

AUGUSTUS H. BATCHELDER.

CERTIFICATE OF CORRECTION.

Patent No. 2,087,395. July 20, 1937.

AUGUSTUS H. BATCHELDER.

It is hereby certified that error appears in the printed specification of the above numbered patent requiring correction as follows: Page 4, second column, line 27, claim 4, for the word "proposition" read proportion; and that the said Letters Patent should be read with this correction therein that the same may conform to the record of the case in the Patent Office.

Signed and sealed this 26th day of October, A. D. 1937.

(Seal)

Henry Van Arsdale,
Acting Commissioner of Patents.